(12) United States Patent
Francavilla (10) Patent No.: US 11,022,090 B2
(45) Date of Patent: Jun. 1, 2021

(54) SYSTEM FOR ENERGY CONVERSION AND RESPECTIVE METHOD

(71) Applicant: Factorytaly S.r.l., Milan (IT)

(72) Inventor: Claudio Francavilla, Milan (IT)

(73) Assignee: FACTORYTALY S.R.L., Milan (IT)

( * ) Notice: Subject to any disclaimer, the term of this patent is extended or adjusted under 35 U.S.C. 154(b) by 77 days.

(21) Appl. No.: 16/479,414

(22) PCT Filed: Jan. 16, 2018

(86) PCT No.: PCT/IB2018/050251
§ 371 (c)(1),
(2) Date: Jul. 19, 2019

(87) PCT Pub. No.: WO2018/134727
PCT Pub. Date: Jul. 26, 2018

(65) Prior Publication Data
US 2019/0360453 A1    Nov. 28, 2019

(30) Foreign Application Priority Data

Jan. 23, 2017  (IT) .......................... 102017000006707

(51) Int. Cl.
*F02B 63/04* (2006.01)
*F03G 7/08* (2006.01)
(Continued)

(52) U.S. Cl.
CPC .............. *F03B 17/025* (2013.01); *F03G 3/00* (2013.01)

(58) Field of Classification Search
CPC .................................. F03B 17/025; F03G 3/00
See application file for complete search history.

(56) References Cited

U.S. PATENT DOCUMENTS

| 5,430,333 A | 7/1995 | Binford et al. |
| 8,667,798 B2 * | 3/2014 | Hopper .................. H02K 35/02 60/649 |

(Continued)

FOREIGN PATENT DOCUMENTS

CN    101413490 A    4/2009

OTHER PUBLICATIONS

International Search Report and Written Opinion dated Apr. 12, 2018 for counterpart PCT Application No. PCT/IB2018/050251.

*Primary Examiner* — Tulsidas C Patel
*Assistant Examiner* — Thomas K Quigley
(74) *Attorney, Agent, or Firm* — Shuttleworth & Ingersoll, PLC; Timothy J. Klima (57) ABSTRACT

A system for energy conversion, including a support structure defining at least one guide channel; at least a plurality of extensible elements between a compressed configuration and a dilated configuration and vice versa and configured to move a volume of a fluid in which they are immersible equal to the predetermined volume difference between the dilated configuration and the compressed configuration of each extensible element. The extensible elements are configured to slide along the guide channel during a switching of the extensible elements. During the switching of the extensible elements the system determines a conversion of potential energy into an useful energy, whose value is proportional to a total volume of the fluid displaced by the extensible elements in the dilated configuration and at a depth reached by an extensible element with respect to said free surface of the fluid.

18 Claims, 5 Drawing Sheets

(51) Int. Cl.
   *F03B 17/02* (2006.01)
   *F03G 3/00* (2006.01)

(56) References Cited

U.S. PATENT DOCUMENTS

| | | | |
|---|---|---|---|
| 9,765,758 B2 * | 9/2017 | Miller | ................ F03G 3/00 |
| 10,100,683 B2 * | 10/2018 | Miller | ................ F03G 7/10 |
| 2013/0205768 A1 | 8/2013 | Kim | |

* cited by examiner

SYSTEM FOR ENERGY CONVERSION AND RESPECTIVE METHOD

This application is the National Phase of International Application PCT/IB2018/050251 filed Jan. 16, 2018 which designated the U.S.

This application claims priority to Italian Patent Application No. 102017000006707 filed Jan. 23, 2017, which application is incorporated by reference herein.

The present invention relates to a system for energy conversion.

In particular, the present invention relates to a system for converting gravitational and/or kinetic energy into useful energy which can be, again, exploitable potential energy or exploitable kinetic energy.

In fact, the present invention relates to a system for energy conversion configured to use the above mentioned useful energy and transfer/convert it in the form of kinetic energy and/or potential energy associating it, for example, with a body having a predetermined mass or with a fluid or with a body having a density immersed in a fluid of different density. In particular, according to the inventive concept of the present invention, the concept of transfer/conversion of useful energy to another form of energy may comprise a phase of gradually accelerating a body provided with a predetermined mass or of bringing a fluid to a certain quantity compared to a horizontal reference.

In the state of the art, the most common systems for energy conversion are those that, for example, concern fluid (dynamic) machines of the operating or driving type. In the case of a fluid machine of the operating type, it is possible to obtain the energy conversion from the machine to a fluid, and therefore a conversion/transfer of, for example, mechanical energy, into an energy of potential and/or kinetic type. In the case of a fluid machine of the driving type it is possible to obtain the energy conversion from a fluid to the machine itself, hence a conversion/transfer of kinetic and/or potential energy into mechanical energy. A more practical example of the best known fluid machines are grinding mills that exploit the energy of water or wind to operate the grinder or more complex machineries that use a fluid under pressure, such as water vapour.

In the state of the art, known fluid machines, such as the one shown by document U.S. Pat. No. 5,430,333, are subject to some limitations due to the structural configuration of the machine itself and above all to the physical phenomena involved in the interaction process between machine and fluid and the other way around. In other words, it is possible to classify and evaluate each fluid machine considering an efficiency value of the machine itself: it is known that fluid machines have a non-high efficiency value considering the fact that the energy transformation involves dissipations of the same in the form of frictions and/or related thermal effects.

In this context, the technical task underlying the present invention is to propose a system for energy conversion and respecting conversion method that overcome the drawbacks and limitation of the known art mentioned above.

In particular, it is an object of the present invention to provide a system for energy conversion and a respective conversion method that allow to exploit/convert the energy of a gravitational, kinetic or other type, e.g., energy arising from the difference in density between two bodies/fluids, in a form of useful energy which may be, by way of example, energy of the kinetic or potential type or a combination of both.

A further object of the present invention is to provide a system for energy conversion and a respective conversion method which have a high efficiency value in terms of energy conversion, that is, a higher efficiency value with respect to machines and systems of the known type.

A further and different object of the present invention is to provide a system for energy conversion and respective conversion method which are reversible and allow the, at least partial, energy recovery which is fed into the system in the form of another type of energy while maintaining a high value of efficiency with respect to reversible systems/machines of the known type.

The technical task mentioned and the objects stated are substantially achieved by a system of energy conversion and respective method comprising the technical characteristics set out in one or more of the appended claims.

The dependent claims correspond to possible embodiments of the invention.

Further characteristics and advantages of the present invention will become more apparent from the description of an exemplary, but not exclusive, and therefore non-limiting preferred embodiment of a system for energy conversion and respective method, as illustrated in the appended drawings, wherein.

In accordance with the preferred embodiment of the present invention, by way of non-limiting example, the system for energy conversion is indicated in the accompanying FIGS. 1 to 5 with the numeral reference 1.

The system for energy conversion 1 is configured to operate in a fluid 100. Preferably, the above fluid 100 is water (without any limitation between brackish water, fresh water or water with the addition of other acidic substances or other types of substances).

In other words, the system for conversion 1 can operate immersed in a basin of fresh water, a containing tank with water, or it can operate at sea or in a lake. Of particular interest for the description of the system for conversion 1 is the reference to a free surface 110 of the aforementioned fluid 100, regardless of whether it is the free surface of an enclosed basin or the free surface of the sea or of a lake.

In particular, the system for energy conversion 1 comprises a support structure 2 having a lower support base 2a suitable for resting on the bottom of the containment tank or of the aforementioned natural basin and an upper support element 2b operatively associated with the support base 2a.

In accordance with the inventive concept of the present invention, the support structure 2 is configured so as to define at least one guide channel 3. The guide channel 3 is such that it extends at least from the support element 2b to the support base 2a of the support structure 2. Preferably, the support structure 2 is configured to define several guide channels 3 arranged parallel to one another, as illustrated by way of non-limiting example in FIG. 1.

The system for conversion 1 further comprises at least a plurality of extensible elements 4 that can be immersed in the aforementioned fluid 100.

Preferably, the system for conversion 1 comprises at least one plurality of waterproof extensible elements 4 which can be immersed in the aforementioned fluid 100.

Each guide channel 3 is configured to house a respective plurality of extensible elements 4, preferably arranged geometrically as a pile, i.e. stacked one on the other, and mechanically water-tightly interconnected between each other.

According to the operation requirements of the system for conversion 1, the pile of extensible elements 4 can easily be inserted and removed from the channel in which it is installed. A possible removal can, for example, be useful for carrying out a system maintenance or for increasing or reducing the number of extensible elements 4 in the pile.

In detail, the extensible elements 4 are configured to switch their state between a compressed configuration and a dilated configuration and vice versa, for example by varying the internal volume which can be reached by means of a dilation/contraction procedure, better described below. It is intended to draw attention to the fact that the structure of the extensible elements 4 is such as to remain relatively rigid and non-deformable even when subjected to the pressure exerted by the fluid in which the element 4 is immersed.

Preferably, the extensible elements 4 in the dilated configuration have a bulk volume preferably equal to at least twice the bulk volume they have in the compressed configuration.

Moreover, each extensible element 4 is individually and reversibly constrained to the support structure 2 by means of locking devices. In other words, each individual extensible element 4 can be individually locked to the support structure 2 in such a way that also the movement of each extensible element 4 is independent to that of any other extensible element 4 which forms the pile. For example, with the system according to the present invention, it would be possible to keep locked all the extensible elements 4 of a pile except one, which could therefore be individually moved without requiring the displacement of the entire pile.

The guide channel 3 of the system for conversion 1 is configured to allow the sliding of the extensible elements 4 along the entire development of the guide channel 3 during the aforementioned reversible switching. In fact, the extensible elements 4 are configured to slide along a respective guide channel 3 during the switching thereof.

Figure 4A:
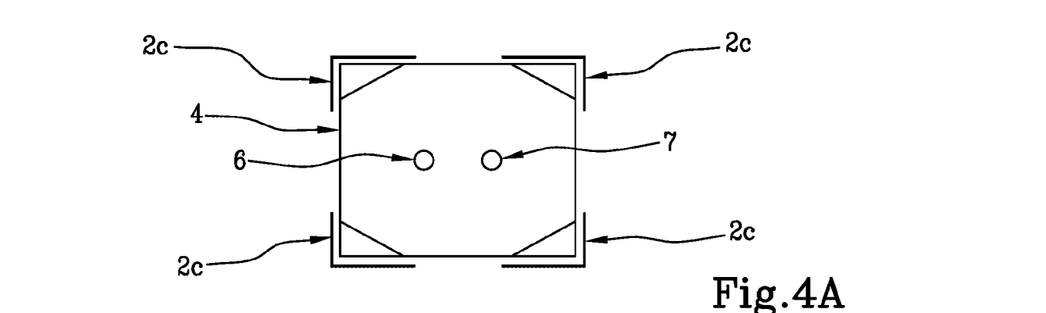
FIG. 4A illustrates in a plan the system of FIG. 1 with further missing parts to better highlight others that are otherwise partially hidden.
Figure 4B:
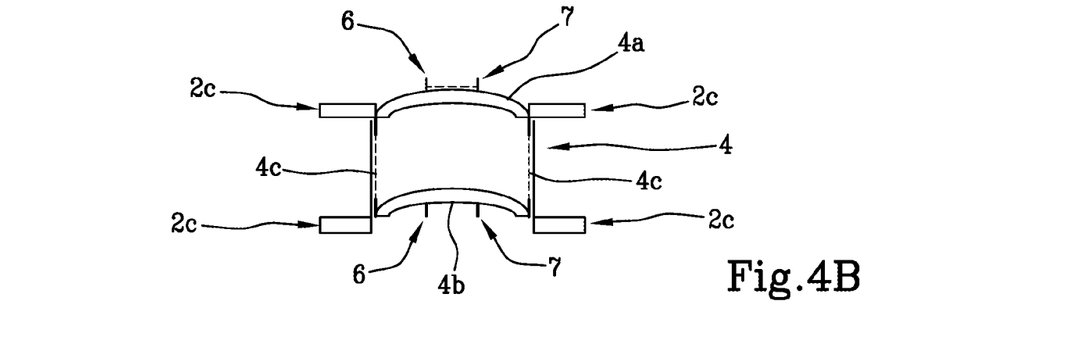
FIG. 4B laterally illustrates the system of FIG. 4A.

Preferably, the support structure 2 comprises sliding elements 2c, illustrated by way of non-limiting example in FIG. 4A, arranged at the ends of each guide channel 3 and configured to allow a low-friction sliding of the extensible elements 4 with respect to the same structure 2.

For this purpose, the system for energy conversion 1 comprises a moving assembly 5 configured to generate a tensile force that can be used for the configuration switching of the plurality of extensible elements 4.

In other words, the system for energy conversion 1 comprises a moving assembly 5 for switching the plurality of extensible elements 4 operatively associated with the support structure 2, and configured to switch along the guide channel 3 the pile of extensible elements 4 from the compressed configuration to that dilated configuration by applying an active tensile force on at least one extensible element of the pile.

It should be noted that, by way of non-limiting example, the determined percentage of energy losses due to the friction involved during the operation of the system for energy conversion 1 is between 1% and 3% of the total energy introduced into the system (for example, by the aforementioned tensile force). Preferably, the energy losses due to friction in the system for conversion 1 of the present invention is around a value of 2.5% of the total energy fed into the system for conversion 1.

Figure 1:
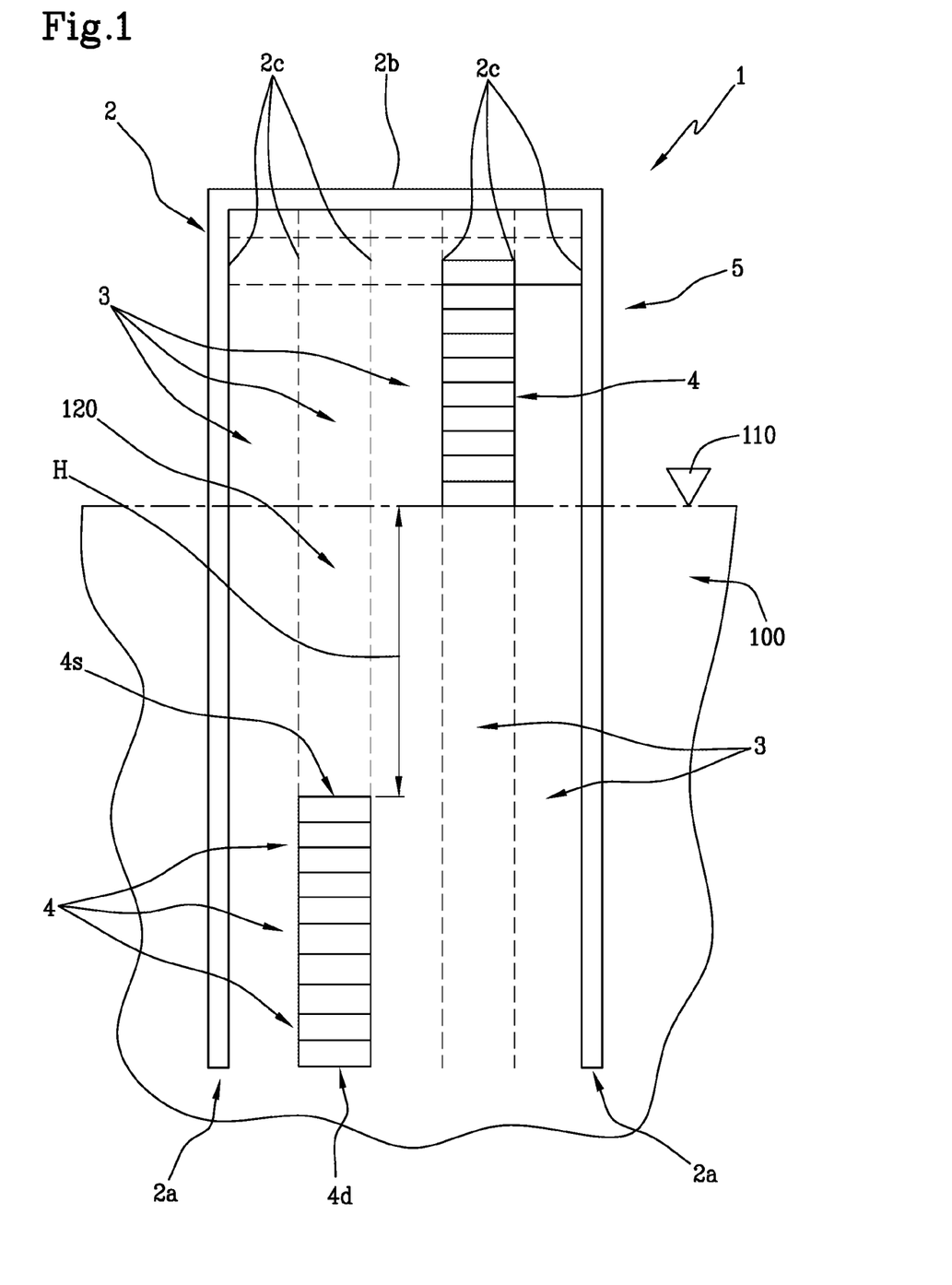
FIG. 1 illustrates a schematic side view of a system for energy conversion according to the present invention.
Figure 2A:
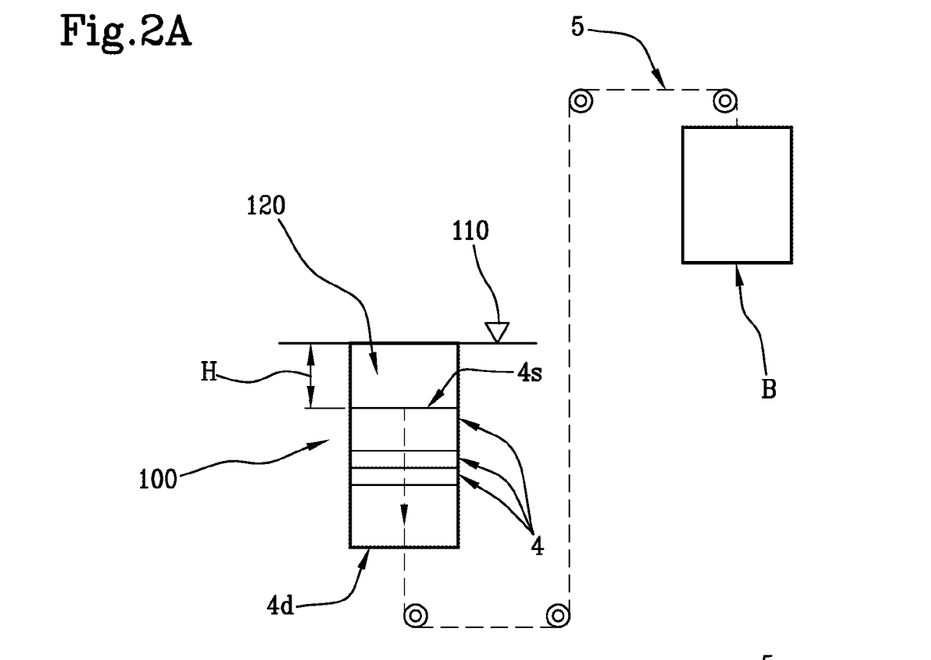
FIG. 2A schematically illustrates an operating phase of the system of FIG. 1.
Figure 2B:
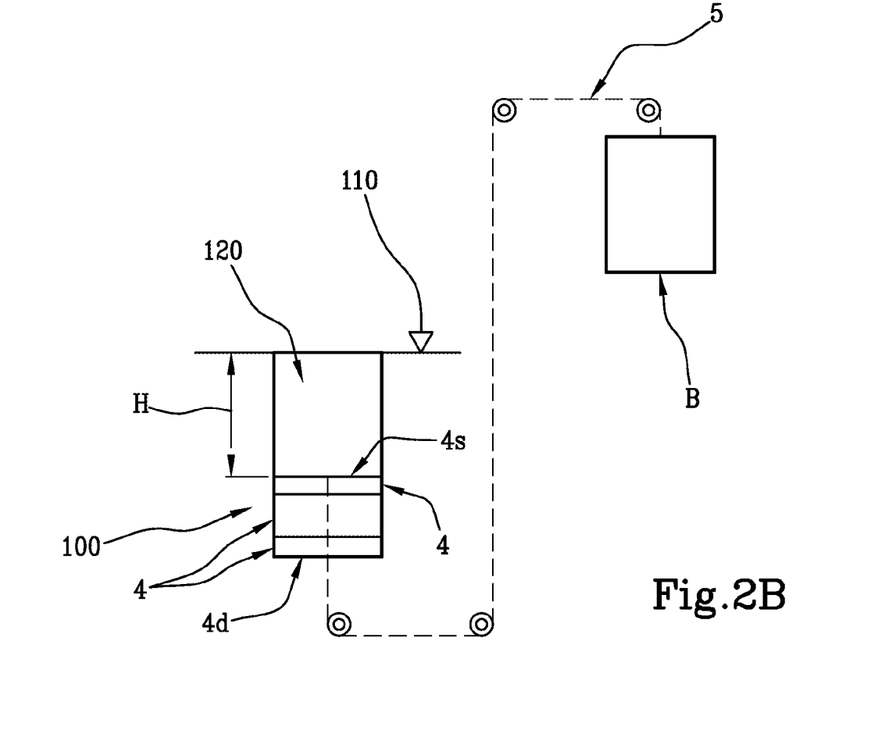
FIG. 2B schematically illustrates a different operating phase of the system of FIG. 1.

According to a preferred embodiment, shown in detail in FIGS. 2A and 2B, the moving assembly exerts a tensile force on at least one extensible element 4 of the pile so as to cause a dilation of at least one extensible element 4 moving away from the free surface 110 of the fluid 100 and, consequently, a respective contraction of the possible extensible element (4) above. In other words, a transfer of the dilatation condition is determined from an extensible element overlying an underlying one.

Figure 2C:
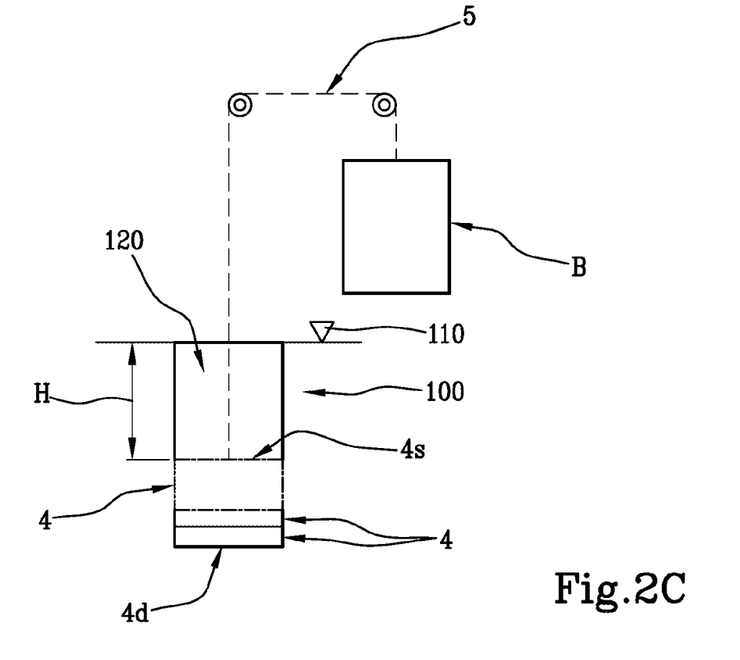
FIG. 2C schematically illustrates a different operating phase of the system of FIG. 1.

According to a further possible embodiment, shown for example in FIG. 2C, the moving assembly exerts a tensile force on an extensible element 4 of the pile so as to cause a dilation of at least one extensible element 4 towards the free surface 110 of the fluid 100. Preferably, the moving assembly 5 is operatively associated to the support element 2b of the support structure 2, however the moving assembly 5 is configured to operate both above and below the free surface 110 of the fluid 100, i.e. both in emersion and in immersion.

By way of example, the moving assembly 5 may comprise a hoist-operated moving system, a mechanical lever system or hydraulic and/or pneumatic systems not illustrated in the accompanying FIGS. 1 to 4B. Preferably, the moving assembly 5 is configured to move at least one pile of extensible elements 4 from a greater height than the free surface 110 of the fluid 100 to a depth "H" predetermined in the fluid 100 and vice versa. In particular, the moving assembly 5 is mechanically connected at least to an extensible element of a pile of extensible elements 4 in turn arranged in a predetermined guide channel 3, as illustrated by way of non-limiting example in the attached FIGS. 2A and 2B. The connection of the moving element 5 with at least the upper extensible element 4s and a lower extensible element 4d of the pile together with the water-tight interconnection between the other extensible elements 4 of the pile allows to switch the plurality of extensible elements 4 with a bellows effect, just as if the extensible elements 4 were part of a single and huge bellows membrane extending longitudinally along the direction of development of the pile of elements 4.

According to the preferred embodiment of the system for conversion 1 of the present invention, each guide channel 3 of the support structure 2 is vertically arranged.

It follows that even the sliding movement of the extensible elements 4a during the switching between the two above mentioned operating configurations takes place in the vertical direction, in addition it follows that the direction of development of the pile of extensible elements 4 is vertically arranged.

With reference to the extensible elements 4, they are configured to move an overall volume of the fluid 100 in which they are immersed equal to the total volume difference obtainable with the switching from the dilated configuration and the compressed configuration of each extensible element 4.

Figure 3A:
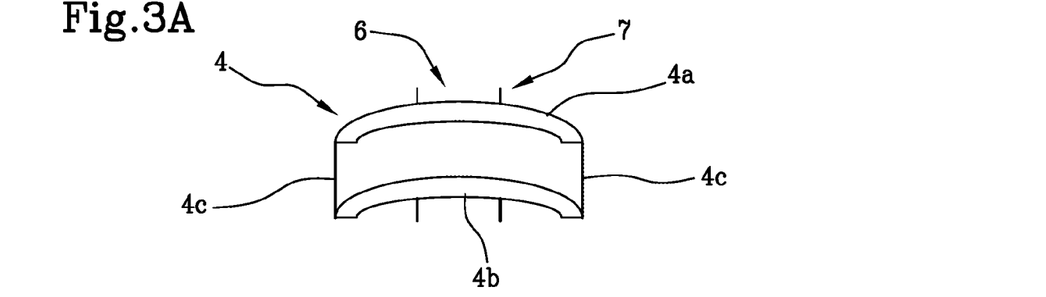
FIG. 3A schematically illustrates the system of FIG. 1 with some missing parts to better highlight others that are otherwise partially hidden.
Figure 3B:
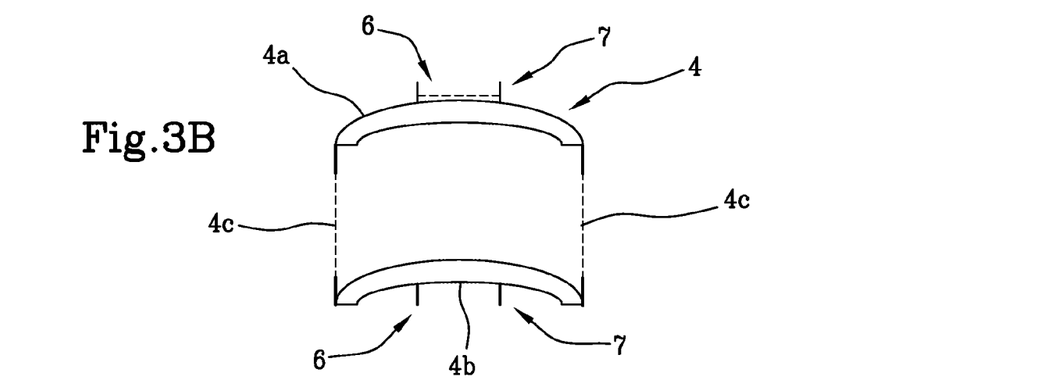
FIG. 3B schematically illustrates the system of FIG. 3A in a different operating configuration.

With reference to the structure of each extensible element 4, schematically illustrated in the attached FIGS. 3A and 3B, each extensible element 4 has a closing top wall 4a and a closing bottom wall 4b operatively coupled to each other by a deformable and/or extensible connecting peripheral wall 4c. Preferably, the top wall 4a and the bottom wall 4b are shaped with a hydrodynamic shape, i.e. directed to reduce the dynamic frictions with the fluid 100; even more preferably, the top wall 4a is shaped with a convex shape and the bottom wall 4b is shaped with a concave shape.

The connecting peripheral wall 4c is made by an impermeable elastic-type sheath or by a composition of a plurality of rigid elements (not shown) which are collapsible on each other in a configuration of compressed extensible element 4 and unwound to be in a configuration of dilated extensible element 4.

The rigid elements not shown are configured to be impermeable and pressure-tight, as described so far for the structure of the extensible elements 4, without any limitation in the technical solutions that can be adopted in accordance with the inventive concept of the present invention.

The aforementioned deformation capacity of the connecting peripheral wall 4c allows the approaching/distancing of the top wall 4a with the bottom wall 4b of each extensible element 4 during the switching from the dilated configuration to the compressed configuration of the pile and vice versa.

According to a further possible embodiment, the peripheral wall 4c is formed by a single deformable and/or extensible connection element common to all of the extensible elements 4, which therefore extends at least from the upper extending element 4s to the bottom extensible element 4d of the pile.

As mentioned above, the extensible elements 4 have interconnection means 6 configured to be mechanically connected to one another. Preferably, also the interconnection means 6 are configured to be mechanically connected water-tight to one another, i.e. the interconnection means 6 are of the water-tight type.

The interconnection means 6, not shown in detail in the appended figures, allow the mechanical connection between an extensible element 4 and the adjacent elements above and below it. In particular, according to the preferred embodiment of the present invention, the interconnection means 6 are arranged at each top wall 4a and bottom wall 4b of each extensible element 4, including the upper extending element 4s mentioned above.

Each extensible element 4 comprises a communication passage 7, illustrated by way of non-limiting example in the attached FIGS. 3A and 3B, configured for placing in fluid communication an extensible element 4 of the pile with the adjacent others, or with those extensible elements 4 that are before and/or after it in the pile. Preferably, in a different embodiment, the communication passage 7 is such as to come out from the closing top wall 4a of the upper extending element 4s towards the outside.

The communication passage 7 extends at least from the upper extending element 4s to the lower extending element 4d of the pile and is such as to vary its own length in accordance with a height of the pile between the compressed configuration and the dilated configuration and vice versa.

The communication passage 7 allows the extensible elements 4 to dilate/contract both with the outside air and with the air already present inside the pile during the switching of their state between the compressed configuration and the dilated configuration and vice versa.

Preferably, the communication passage 7 extends at least from the upper extensible element 4s to overcome the free surface 110 of the fluid 100 and be in fluid connection with the exterior.

In an embodiment, as illustrated by way of non-limiting example, the communication passage 7 comprises the sectors interposed between an extensible element 4 and the adjacent ones (for example above and below) as a tube passing through the diaphragms subdividing the extensible elements 4 themselves.

In a different embodiment, the communication passage 7 can comprise an extensible telescopic tube going through all the extensible elements 4 of the pile, starting from the lower extending element 4d up to the upper extending element 4s.

In a different and further embodiment, not shown, the communication passage 7 can be obtained along one or more of the sliding elements 2c of the system 1 by means of seal piping systems and fluid connecting techniques, e.g., already known in the state of the art.

In fact, an interconnection of the mechanical type between each extensible element 4 allows a traction/compression action performed at least on an extensible element 4 located in one of the two ends of the pile, that is to say the upper extensible element 4s or the lower extensible element 4d, allows the triggering of the switching between the compressed and dilated configurations and vice versa allowing the raising/lowering of the pile of extensible elements 4 of the system for conversion 1. On the other hand, the communication passage 7 allows the spontaneous inflow/outflow of air from each extensible element 4 of the pile as a reaction to the deformation of the connecting peripheral wall 4c during switching.

According to a preferred embodiment, each extensible element 4 is individually bound upon command to the support structure 2, defining the guide channel 3 inside which the pile of extensible elements 4 is inserted, in a reversible manner.

In this way it is possible to efficiently transfer a volume of air, introduced into the pile via the communication passage, from an extensible element 4 of the pile to another.

This embodiment is particularly useful in the case wherein the system is produced using a moving assembly 5 which exerts a tensile force towards the bottom of the support structure, which then determines a dilation of the extensible bodies 4 moving away from the free surface 110 of the fluid 100.

In fact, in the just outlined situation, it is made possible to efficiently transfer a volume of air, introduced into the pile by means of the communication passage 7, from an extensible element 4 to another.

By applying the tensile force to the upper surface 4a of the upper extending element 4s, keeping the lower surface 4b locked, keeping the upper surface 4a of the extensible element immediately below locked (and thus leaving the bottom wall 4b free to move downwards), applying the same tensile force to the wall 4b of a lower extending element at the same time, while all the other extensible elements 4 are movable and non-dilating, the upper extensible element 4s is contracted and the air contained therein is transferred to the immediately lower extensible element 4 which then passes into a dilated configuration.

It is therefore sufficient to repeat the operation, keeping locked the lower surface 4b of the extending element which is to be contracted and the upper surface 4a of the element to be dilated, in order to obtain an air displacement towards lower extensible elements 4.

Consequently, a progressive displacement of a mass of air towards the bottom of the guide channel 3 defined by the support structure 2 is obtained, simply increasing the stored potential energy.

According to the inventive concept of the present invention, the system for energy conversion 1 by switching the extensible elements 4 from the compressed configuration to the dilated configuration determines a conversion of potential energy into useful energy whose value is proportional to a total volume of the fluid 100 displaced by the extensible elements 4 in a dilated configuration and to a depth "H" reached by the extensible element of the pile in a dilated configuration with respect to the free surface 110 of the fluid 100.

In accordance with the inventive concept of the present invention, the system for energy conversion 1 is configured to switch the energy accumulated by the extensible elements 4 from the dilated configuration in the form of an Archimedean thrust "S", since the fully dilated pile is disposed at a distance under the free surface 110 of the fluid 100, in useful energy whose value is proportional to a mean distance (depth) that the pile of extensible elements 4 has with respect to the aforesaid free surface 110 and to the total volume of the fluid 100 displaced by the extensible elements 4 in a dilated configuration.

In other words, the greatest energy resource that the system is able to exploit and convert to another type of energy is given by the Archimedean thrust "S" that is generated due to the different density between the fluid contained in the dilated extensible elements 4 (preferably atmospheric air) and the density of the fluid 100 in addition to the distance of the pile with respect to the free surface 110, as described above.

Figure 5:
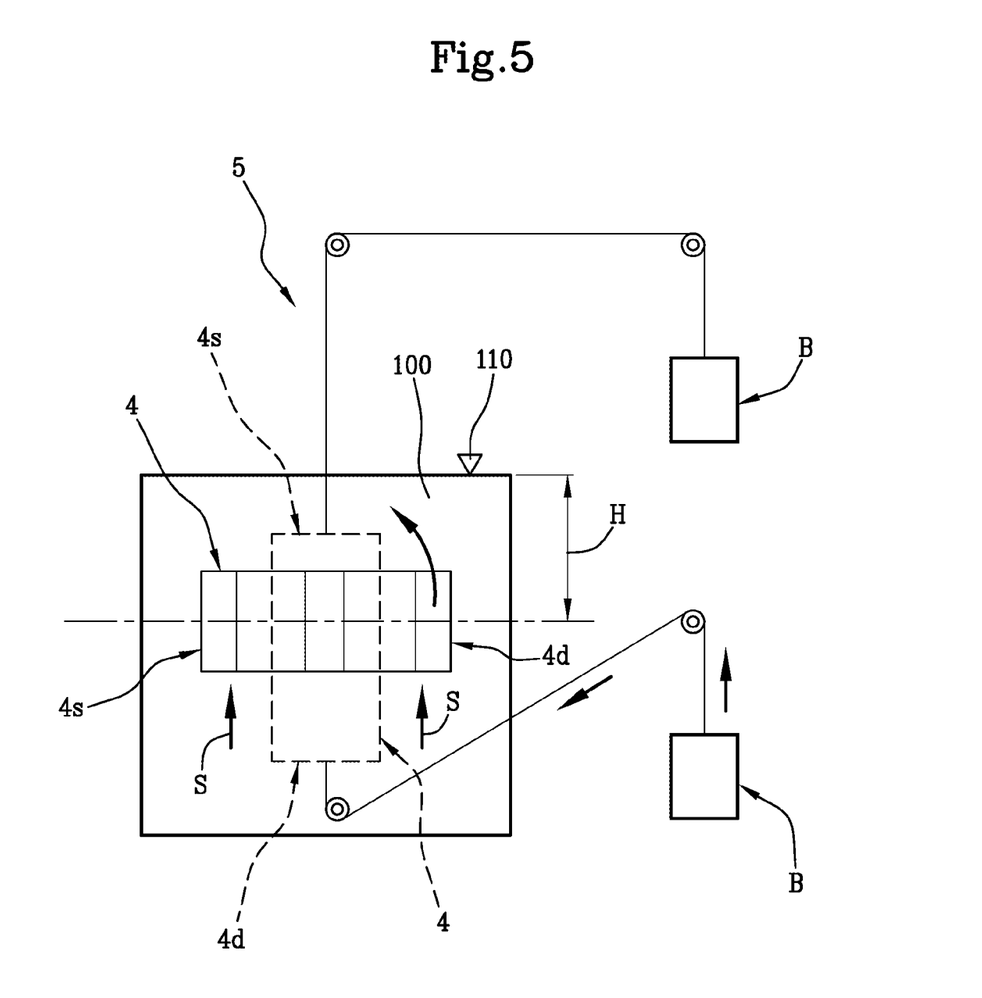
FIG. 5 schematically illustrates a further and different operating phase of the system of FIG. 1.

In accordance with the inventive concept of the present invention, the Archimedean thrust "S" acting on the pile by means of the dilated extensible elements 4 placed at a predetermined distance under the free surface 110 of the fluid 100 determines the greatest contribution of energy convertible into useful energy with respect to the other aspects described above, such as, for example, the displacement of a predetermined mass (embodiment better described below). FIG. 5 attached illustrates, by way of non-limiting example, an embodiment of the system for conversion 1 in which the pile of dilated expandable elements 4 can be rotated, e.g., by means of the moving assembly 5, in such a position that all the extensible elements 4 have the same distance "H" from the free surface 110 of the fluid 100 so as to exploit the Archimedean thrust "S" for the energy switching in a progressive and uniform manner.

In particular, the system for energy conversion 1 is configured to determine a conversion of potential energy into useful energy that can be exploited in the form of kinetic and/or potential energy that can be stored by means of a mechanical system, or a system of hydraulic type or of another type.

An example of the system for energy conversion 1 which allows to store/convert the potential energy into kinetic and/or potential energy is illustrated schematically in the annexed FIGS. 2A and 2B.

Preferably, the useful energy obtained by conversion from the system for conversion 1 of the present invention is exploitable kinetic energy by moving a body "B" having a predetermined mass, just as illustrated for example in FIGS. 2A and 2B above. Preferably, the system for energy conversion 1 of the present invention allows to exploit and/or accumulate the useful energy obtained from the conversion by transferring an amount of momentum to the body "B".

Alternatively, by way of non-limiting example, the system for energy conversion 1 comprises conversion means comprising an impeller and an electric generator or other bodies having a variable mass according to the condition of use of the system, such as, e.g., a catenary of ballast elements "Z", not shown in the attached figures.

The useful energy obtained by conversion from the system for conversion 1 of the present invention is directly proportional to the volume of fluid 100 displaced during the switching of the extensible elements 4 from the compressed to the dilated configuration.

As already mentioned, the moving assembly 5 allows the conversion of one or more extensible elements 4 from the compressed to the dilated configuration by applying an active tensile force at least on an extensible end element 4s to 4d.

In accordance with the functional configuration of the system for conversion 1 of the present invention, it is intended to draw attention to the fact that the aforementioned tensile force exerted by the moving assembly 5 is proportional to the height of a column 120 of fluid 100 which insists on the pile and the number of extensible elements 4 actually switched in the dilated configuration.

This implies that even a partial, then incomplete, dilated switching of one or more extensible elements 4 contributes to the displacement of a determined volume of fluid 100 thus increasing the rate or the percentage of useful energy convertible by the system for conversion 1 itself, although it does not reach the predetermined optimum value of volume increase of the extensible element 4 which preferably must be at least 100%, as already mentioned.

Up to now, the system for conversion 1 of the present invention has been described in a structural and functional manner during the switching of the extensible elements 4 from the compressed to the dilated configuration.

However, the system for energy conversion 1 is configured to also manage the switching that restores the initial operating condition of the system itself, i.e. the switching of the extensible elements in the compressed configuration starting from the dilated (complete or partial) configuration.

According to the inventive concept of the present invention, the switching of the extensible elements 4 from the dilated configuration to the compressed configuration takes place by the effect of a gravity force acting at least on each extensible element 4, obviously starting from the (complete or partial) dilated configuration.

In other words, the system for energy conversion 1 of the present invention is such as to restore the initial configuration of the extensible elements by exploiting the gravity force acting on the structure of each extensible element 4 and/or by the pressure that the fluid 100 exerts on the outer surface of each extensible element 4 when immersed in the fluid 100 itself. During the restoration of the compressed configuration of the extensible elements 4, the amount of exceeding air contained in the same elements 4 escapes through the communication passage 7 described above if carried out during immersion. The same communication passage 7 is configured to contract and reduce its own length.

According to the inventive concept of the present invention, the system for energy conversion 1 is configured in such a manner that the work for switching the extensible elements 4 of a pile from the compressed configuration to the dilated configuration to bring the upper extensible element 4s at a predetermined depth "H" from the free surface 110 is equal to the work usable to bring said total volume of fluid 100 displaced to the same distance from the free surface 110 of the fluid 100.

Preferably, the system for energy conversion 1 is configured in such a manner that the work for switching the extensible elements 4 of a pile from the compressed configuration to the dilated configuration to bring the upper extensible element 4s at a predetermined depth "H" from the free surface 110 is equal to or lower than the work usable to bring the total volume of fluid 100 displaced to the same distance "H" from the free surface 110 of the fluid 100.

In accordance with the present invention, the system for energy conversion 1 described above can comprise a single guide channel 3 and a single extensible element 4 such as to allow, during the switching thereof from the compressed configuration to the dilated configuration, a conversion of potential energy in useful energy whose value is proportional to a total volume of fluid 100 displaced by the extensible element 4 in a dilated configuration and at a depth "H" reached by the aforesaid an extensible element 4 with respect to said free surface 110 of the fluid 100.

Preferably, the work for switching the only extensible element 4 from the compressed configuration to the dilated configuration to bring it to a predetermined depth "H" from the free surface 110 is equal to or lower than the work usable to bring the total volume of fluid 100 displaced to the same distance "H" from the free surface 110.

In accordance with the inventive concept of the present invention, a method for energy conversion is defined, comprising the steps of:

arranging a system for energy conversion 1 as described above;

arranging a plurality of extensible elements 4 in a guide channel immersed in a fluid, in the compressed configuration and wherein said the upper extensible element 4s is arranged below a free surface 110 of the fluid 100;

switching one or more of the extensible elements 4 repeating the operation to transfer the air to a lower extensible element;

recovering the volume of fluid 100 displaced due to the switching of said extensible elements 4 and/or exploiting the kinetic and/or potential energy of said volume of fluid 100 to operate conversion elements of the system 1, preferably the conversion elements comprising an impeller of an electrical generator; and/or converting a potential energy into kinetic energy by moving a body "B" having a predetermined mass, preferably accumulating said kinetic energy in the form of a momentum of the body "B".

In addition to what has been described above, the energy conversion method, comprising a series of steps, better illustrated by way of non-limiting example in the attached FIG. 5:

switching the extensible elements 4 from the compressed configuration to the dilated configuration by operating the moving assembly 5; arranging the extensible elements 4 of the pile in a horizontal manner, with respect to the initial position, such that each extensible element 4 is arranged at the same distance "H" from a free surface 110 of said fluid 100;

converting an Archimedean thrust "S" acting on the plurality of the extensible elements 4 immersed into the fluid 100 into kinetic energy by moving a body "B" having a predetermined mass, preferably accumulating said kinetic energy in the form of a momentum of said body "B"; and/or converting the Archimedean thrust "S" acting on the plurality of the extensible elements 4 immersed into the fluid 100 into potential energy by moving a body "B" having a predetermined mass; and/or converting the Archimedean thrust "S" acting on the plurality of the extensible elements 4 immersed in the fluid 100 into electrical energy by means of an electric generator.

In addition to the above, the energy conversion method, comprising the step of restoring the level of the fluid 100 contained in the natural basin or in the containment tank so that in the dilated configuration of the extensible elements 4 the upper extensible element 4s is located below the free surface 110 of the fluid 100.

Preferably, the energy conversion method comprises, when necessary, the step of restoring the level of the fluid 100 contained in the natural basin or in the containment tank so that in the dilated configuration of the extensible elements 4 the upper extensible element 4s is arranged at the free surface 110 of the fluid 100.

The present invention has achieved the intended purposes.

Advantageously, the present invention provides a system for energy conversion which allows to obtain a conversion of potential energy into useful energy proportionally to a depth value of the extensible elements with respect to a free surface of a fluid and wherein the extensible elements are being dilated, there is an increasing rate of storable/convertible useful energy Advantageously, the present invention provides a system for energy conversion which makes it possible to determine a useful work which proportionally increases to a path that the extensible elements perform as a result of switching from the compressed configuration to the dilated configuration.

Advantageously, the system for energy conversion which makes it possible to exploit a component (in terms of force) of the Archimedean thrust, determined by the variation in volume that each extensible element performs, so as to convert/store it in the form of kinetic and/or potential energy or an increase in the momentum of a body having a predetermined mass.

The invention claimed is:

1. A system for energy conversion, comprising:
a support structure which defines at least one guide channel;
a plurality of extensible elements switchable between a compressed configuration and a dilated configuration, and vice versa, and configured to move a volume of a fluid in which said plurality of extensible elements immersed, the volume being equal to a predetermined volume difference between the dilated configuration and the compressed configuration of each of said plurality of extensible elements, said plurality of extensible elements being arranged into a pile of extensible elements interconnected between each other, watertight and laying in said fluid at a predetermined depth, each of said plurality of extensible elements being individually and reversibly bound to the support structure by locking devices;
a moving assembly of said plurality of extensible elements operably linked to said support structure, wherein said moving assembly is configured to switch said pile of extensible elements from said compressed configuration to said dilated configuration by a tensile strength acting on at least one extensible element of said pile;

wherein said plurality of extensible elements are configured to slide along said at least one guide channel during a switching of said plurality of extensible elements from said compressed configuration to said dilated configuration, and vice versa;

wherein, as a result of said switching of said plurality of extensible elements from the compressed configuration to the dilated configuration, said system determines a conversion of potential energy to a useful energy having a value proportional to a total volume of said fluid displaced by said plurality of extensible elements in the dilated configuration and at a depth reached by the extensible elements of said pile with respect to a free surface of said fluid.

2. The system according to claim 1, wherein said plurality of extensible elements is arranged in said pile of extensible elements interconnected to each other so as to extend away from the free surface of said fluid.

3. The system according to claim 1, wherein said plurality of extensible elements is arranged in said pile of extensible elements interconnected to each other so as to extend towards the free surface of said fluid.

4. The system according to claim 1, wherein said system for energy conversion is configured to determine the conversion of potential energy into the useful energy exploitable as at least one chosen from a storable kinetic energy and a potential energy, said useful energy being kinetic energy exploitable by moving a body having a predetermined mass or being a kinetic/potential energy exploitable to drive an electrical generator and to produce electrical power.

5. The system according to claim 1, wherein said moving assembly is configured to provide an active tensile force on an extensible element of the pile, connected to other extensible elements of the pile.

6. The system according to claim 5, wherein said tensile force exerted by said moving assembly for the extension of said extensible elements is proportional to a height of a fluid column against the pile of extensible elements and to the number of extensible elements switched to the dilated configuration.

7. The system according to claim 1, wherein a work for switching the extensible elements of said pile from the compressed configuration to the dilated configuration to bring said upper extensible element to a predetermined depth from the free surface is equal to or lower than the work usable to bring said total displaced volume of fluid to a same distance from the free surface of the fluid.

8. The system according to claim 1, wherein said extensible elements in said dilated configuration have a volume of 1.1 to 2.5 times greater than a volume in the compressed configuration.

9. The system according to claim 1, wherein each of said plurality of extensible elements has a convex closing top wall and a concave bottom wall, operatively coupled to each other by a connecting peripheral wall at least one chosen from a deformable and/or extensible connecting peripheral wall.

10. The system according to claim 9, wherein said connecting peripheral wall is made by an impermeable elastic-type sheath or by a composition of a plurality of impermeable rigid elements, which are collapsible on each other in a configuration of compressed extensible element and unwound to be in a configuration of dilated extensible element.

11. The system according to claim 9, wherein said connecting peripheral wall is a single elastic waterproof sheath, or a single composition of a plurality of impermeable rigid elements which extends from the upper extensible element to a lower extensible element of said pile.

12. The system according to claim 1, wherein said plurality of extensible elements have interconnection means configured to be connected mechanically and in a fluid-tight manner to each other, and having a communication passage configured to accommodate communication of fluid of an extensible element with a previous extensible element and/or a next extensible element, in a condition of extensible elements arranged in a pile, the interconnection means being fluid-tight means.

13. The system according to claim 12, wherein said communication passage extends at least from an upper extensible element to a lower extensible element of the pile and so as to vary a corresponding length between said compressed configuration and said dilated configuration of said plurality of extensible elements, and vice versa, said communication passage comprising a plurality of sectors interposed between an extensible element and adjacent extensible elements.

14. The system according to claim 1, wherein said support structure comprises a lower resting base suitable to be rested on a bottom of a containment tank or a natural basin, and a top holding member operably linked to said resting base, and configured to move at least one pile of said extensible elements from a higher height of said free surface of said fluid at a predetermined depth in said fluid, and vice versa.

15. The system according to claim 1, wherein said locking devices are configured to reversibly bind a bottom wall of an extensible element with the support structure.

16. A method for energy conversion, comprising the steps of:
providing a system for energy conversion comprising:
a support structure which defines at least one guide channel;
a plurality of extensible elements switchable between a compressed configuration and a dilated configuration, and vice versa, and configured to move a volume of a fluid in which said plurality of extensible elements immersed, the volume being equal to a predetermined volume difference between the dialated configuration and the compressed configuration of each of said plurality of extensible elements, said plurality of extensible elements being arranged into a pile of extensible elements interconnected between each other, water-tight and laying in said pluid at a predetermined depth, each of said plurality of extensible elements being individually and reversibly bound to the support structure by locking devices;
a moving assembly of said plurality of extensible elements operably linked to said support structure, wherein said moving assembly is configured to switch said pile of extensible elements from said compressed configuration to said dilated configuration by a tensile strength acting on at least one extensible element of said pile;
plurality of extensible elements are configured to slide along said at least one guide channel during a switching of said plurality of extensible elements from said compressed configuration to said dilated configuration, and vice versa;
wherein, as a result of said switching of said plurality of extensible elements from the compressed configuration to the dilated configuration, said system determines a conversion of potential energy to a useful energy having a value proportional to a total volume of said fluid displaced by said plurality of extensible elements in the dilated configuration and at a depth reached by the extensible elements of said pile with respect to a free surface of said fluid;

arranging the plurality of extensible elements inside a natural basin of the fluid or a containment tank of the fluid in the compressed configuration, and wherein said upper extensible element is arranged below the free surface of said fluid;

switching at least one extensible element from said compressed configuration to said dilated configuration by actuation of said moving assembly;

transferring an air mass from an extended extensible element to a compressed extensible element below the extended extensible element, restoring the compressed configuration of the extensible element causing the dilation of the extensible element below extended extensible element;

converting an Archimedean thrust acting on a lower extensible element placed in a dilated configuration into kinetic energy by moving a body having a predetermined mass, accumulating said kinetic energy as a momentum of said body; and/or converting an Archimedean thrust acting on the lower extensible element into electrical energy by driving of an electric generator;

recovering the volume of fluid displaced during the switching of said extensible elements and/or exploiting the kinetic and/or potential energy of said volume for operating conversion elements, said conversion elements comprising an impeller of the electrical generator; and/or converting a potential energy into kinetic energy by moving the body having the predetermined mass, accumulating said kinetic energy as a momentum of said body.

17. The method according to claim 16, comprising the steps of:

switching said plurality of extensible elements from said compressed configuration to said dilated configuration by the actuation of said moving assembly;

arranging the extensible elements of the pile in a horizontal manner, relative to an initial position, such that each extensible element is arranged to a same distance from the free surface of said fluid;

converting an Archimedes' thrust acting on the plurality of said extensible elements dipped into the fluid into kinetic energy by moving the body having the predetermined mass, accumulating said kinetic energy as a momentum of said body; and/or converting an Archimedean thrust acting on the plurality of said extensible elements immersed into the fluid dipped into the fluid into potential energy by moving the body having the predetermined mass; and/or converting an Archimedean thrust acting on the plurality of said extensible elements immersed into the fluid dipped into the fluid into electrical energy by the actuation of the electrical generator.

18. The method according to claim 16, comprising:

restoring a level of said fluid in said natural basin or in said containment tank so that, in the dilated configuration of said extensible elements, said upper extensible element is arranged below or at the free surface of said fluid.

\* \* \* \* \*